United States Patent
Park et al.

(10) Patent No.: US 8,624,901 B2
(45) Date of Patent: Jan. 7, 2014

(54) APPARATUS AND METHOD FOR GENERATING FACIAL ANIMATION

(75) Inventors: Bong-cheol Park, Hwaseong-si (KR);
Sung-gun Jung, Anyang-si (KR);
Hyo-won Kim, Hwaseong-si (KR);
Moon-ho Park, Seoul (KR); Du-na Oh,
Seoul (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 939 days.

(21) Appl. No.: 12/699,229

(22) Filed: Feb. 3, 2010

(65) Prior Publication Data
US 2010/0259538 A1    Oct. 14, 2010

(30) Foreign Application Priority Data
Apr. 9, 2009  (KR) .................. 10-2009-0030794

(51) Int. Cl.
*G06T 13/00*    (2011.01)
(52) U.S. Cl.
USPC .......................... 345/473; 345/419; 345/581
(58) Field of Classification Search
None
See application file for complete search history.

(56) References Cited

U.S. PATENT DOCUMENTS

| | | | | |
|---|---|---|---|---|
| 5,933,151 A * | 8/1999 | Jayant et al. | ................... | 345/473 |
| 6,043,827 A * | 3/2000 | Christian et al. | ............... | 345/474 |
| 6,097,381 A * | 8/2000 | Scott et al. | ..................... | 715/203 |
| 6,633,294 B1 * | 10/2003 | Rosenthal et al. | ............ | 345/474 |
| 6,654,018 B1 * | 11/2003 | Cosatto et al. | ................. | 345/473 |
| 6,919,892 B1 * | 7/2005 | Cheiky et al. | ................. | 345/473 |
| 7,050,655 B2 | 5/2006 | Ho et al. | | |
| 2002/0080139 A1 | 6/2002 | Koo et al. | | |
| 2004/0056857 A1 * | 3/2004 | Zhang et al. | ................... | 345/419 |
| 2006/0164440 A1 * | 7/2006 | Sullivan et al. | ............... | 345/639 |
| 2006/0176301 A1 | 8/2006 | Sohn et al. | | |
| 2008/0136814 A1 | 6/2008 | Chu et al. | | |

FOREIGN PATENT DOCUMENTS

| | | |
|---|---|---|
| KR | 10-2002-0054243 | 7/2002 |
| KR | 10-2002-0085669 | 11/2002 |
| KR | 10-0530812 | 11/2005 |
| KR | 10-2006-0082984 | 7/2006 |
| KR | 10-0601989 | 7/2006 |
| KR | 10-2008-0051007 | 6/2008 |
| WO | WO 99/53443 | 10/1999 |

OTHER PUBLICATIONS

Pyun, Hye-won, "An On-line Performance-driven Approach to Real-time Facial Motion Capture and Generation," Apr. 20, 2004, Department of Electrical Engineering & Computer Science Division of Computer Science, Korea Advanced Institute of Science and Technology, Daejeon, South Korea, pp. i-79.

(Continued)

*Primary Examiner* — Said Broome
(74) *Attorney, Agent, or Firm* — NSIP Law

(57) ABSTRACT

An apparatus and method for generating an animation of a virtual character using video data and a limited number of three-dimensional (3D) key models of a virtual character, are provided. The video data includes a sequence of two-dimensional image frames. The key models are blended together using the calculated weights, and a 3D facial expression most similar to the 2D facial expression included in each image frame may be generated. When the above operations are performed for input video data including a sequence of image frames, a facial animation, which makes facial expressions according to facial expressions included in the video data may be created.

20 Claims, 9 Drawing Sheets

(56) References Cited

OTHER PUBLICATIONS

Park, Bongcheol, et al., "A Feature-Based Approach to Facial Expression Cloning," Feb. 3, 2004, Department of Computer Science, Korea Advanced Institute of Science and Technology, South Korea, pp. 1-17.

Brox, Thomas, et al., "High Accuracy Optical Flow Estimation Based on a Theory for Warping," Mathematical Image Analysis Group of Saarland University, Saarbrucken, Germany, In Proc. 8th European Conference on Computer Vision, Springer LNCS 3024, T. Pajdla and J. Matas (Eds.), vol. 4, pp. 25-36, Prague, Czech Republic, May 2004.

Park Doyoung, et al., "Motions Syntheses in 3D Facial Model Using Features and Motion Parameters Estimated Through Optical Flow," Department of Computer Science, Yonsei University, 1998, pp. 408-410.

Sloan, Peter-Pike J. et al., "Shape by Example," Proceedings of the 2001 Symposium on Interactive 3D Graphics, 2001, pp. 135-143.

* cited by examiner

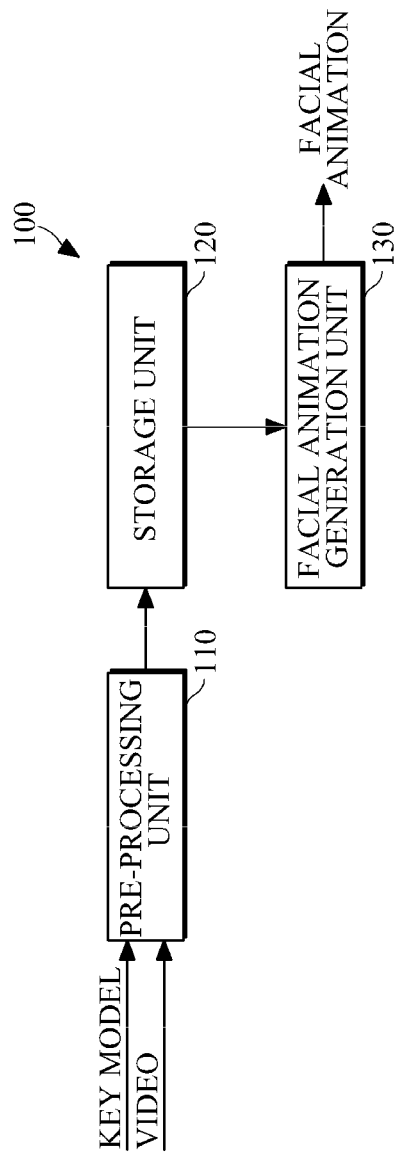

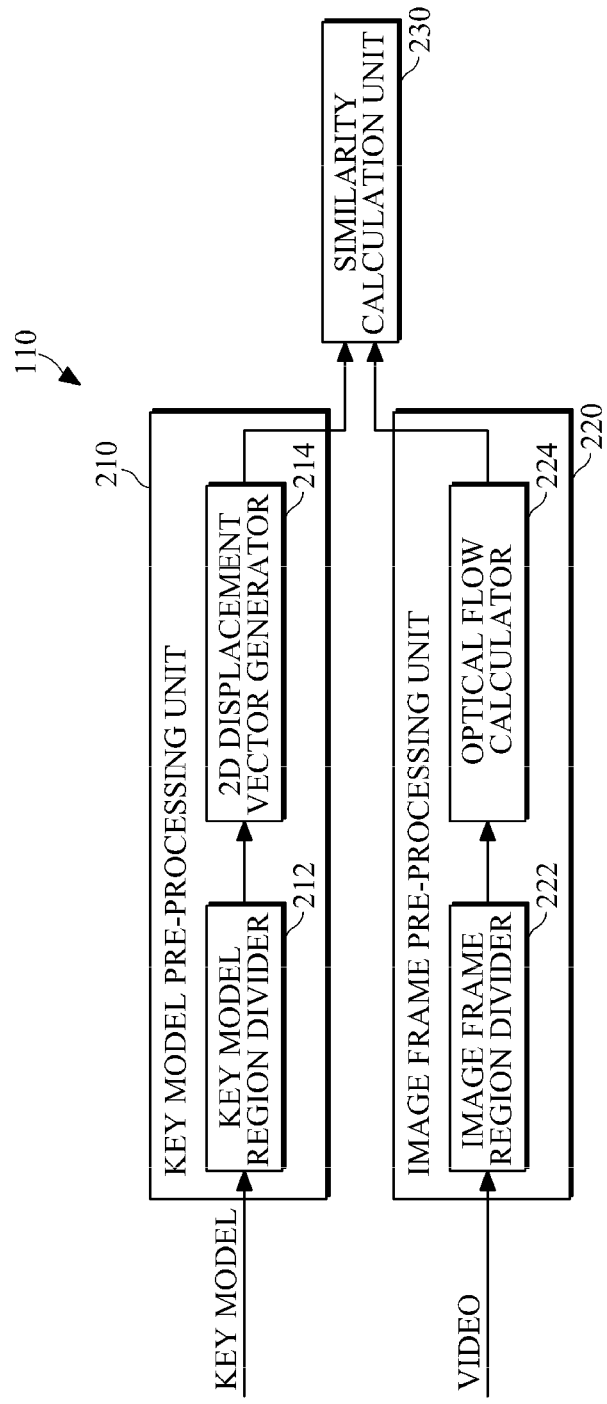

APPARATUS AND METHOD FOR GENERATING FACIAL ANIMATION

CROSS REFERENCE TO RELATED APPLICATION

This application claims the benefit under 35 U.S.C. §119(a) of Korean Patent Application No. 10-2009-0030794, filed on Apr. 9, 2009, in the Korean Intellectual Property Office, the entire disclosure of which is incorporated herein by reference for all purposes.

BACKGROUND

1. Field

The following description relates to facial animation generation technology, and more particularly, to an apparatus and method for generating an animation of a facial character with various facial expressions using a plurality of key models.

2. Description of the Related Art

Facial animation of virtual characters is becoming important not only in the fields of animation, movies, and games, but also in products closely related to daily lives, for example, billboards, electronic devices, information desks, and the like. For example, human-like conversation systems may be used in electronic goods that have user interactions, such as televisions, cameras, phones, and camcorders.

Producing facial animation of virtual characters is labor-intensive work that involves a lot of time and effort. Data-based facial animation is drawing a lot of attention, because in data-based facial animation, desired facial animation may be generated more efficiently by reusing existing data. In data-based facial animation, obtaining a large number of high-quality facial animation data samples is desirable.

According to another method of facial animation, a database of facial expressions and mouth shapes of people may be scanned as three-dimensional (3D) information and may be employed. The facial animation may be generated from a single image by blending the 3D information.

The above facial animation data may be obtained by capturing facial expressions of real people using motion capture or stereo imaging technology. Facial expressions using this technology generate facial animation data that is natural. However, there are many restrictions in obtaining the facial animation data. That is, expensive specialized equipment is needed to obtain the facial animation data. In addition, this equipment cannot be installed in a home or office environment. It must be installed in a special environment with special lighting and backgrounds to obtain the facial animation data. Furthermore, markers must be attached to the face of a person making a facial expression, or the face of the person must be colored. That is, a considerable amount of time is needed to prepare for the acquisition of the facial animation data.

SUMMARY

In one general aspect, there is provided an apparatus for generating facial animation, the apparatus including: a pre-processing unit for selecting image frame having a facial region that is most similar to a facial region of one of a plurality of key models of facial characters from a sequence of image frames, each image frame being divided into a plurality of facial regions; and a facial animation generation unit for determining a blending weight for each facial region of each of the key models using the selected image frame and for synthesizing facial character shapes on a facial region-by-facial region basis using the determined blending weight for each facial region of each of the key models.

The pre-processing unit may process each of the plurality of key models and determine a plurality of facial regions for the key models, and set patches corresponding individually to the facial regions of each of the key models, in each of the image frames.

The pre-processing unit may divide each of the key models into a left eye region, a right eye region, and a mouth region, and set patches, which correspond to the left eye region, the right eye region, and the mouth region, in each of the image frames.

The pre-processing unit may compare directions of respective two-dimensional (2D) displacement vectors of vertices included in each key model with directions of respective optical flow vectors of pixels included in each image frame and calculate a similarity between the directions, wherein the 2D displacement vectors are determined based on vertices included in one of the key models, and the optical flow vectors of the pixels are generated by calculating optical flows of the pixels based on pixels included in one of the image frames.

The pre-processing unit may determine respective three-dimensional (3D) displacement vectors of the vertices included in each key model, based on one of the key models, and project the 3D displacement vectors onto a 2D plane to generate the 2D displacement vectors of the vertices.

The pre-processing unit may divide each facial region of each key model into a plurality of sub-facial regions and divide each facial region of each image frame into a plurality of sub-facial regions and calculate a similarity between a direction of an average vector representing the average of 2D displacement vectors in each sub-facial region of each key model and a direction of an average vector representing the average of optical flow vectors in a corresponding sub-facial region of each image frame.

The pre-processing unit may divide each facial region of each key model and of each image frame into quadrants.

The pre-processing unit may set an optical flow vector of the facial region of the image frame, which is most similar to a facial region of a key model, as a seed, cluster optical flow vectors of the facial regions of the other image frames using the optical flow vector set as the seed, and determine an image frame having an optical flow vector, which corresponds to the average of all optical vectors in each cluster as an image frame having a facial region most similar to a facial region of a key model in the cluster.

The pre-processing unit may group the optical flow vectors of the image frames into a number of clusters equal to the number of key models.

The facial animation generation unit may use a four-dimensional (4D) vector, which indicates a direction of an optical flow vector in each quadrant of each facial region, as a parameter to determine the blending weight for each facial region of each key model.

The facial animation generation unit may determine the blending weight for each facial region of each key model such that the determined blending weight is inversely proportional to a distance of a representative parameter value corresponding to each key model from the parameter of the image frame.

The facial animation generation unit may generate a whole facial character by generating a facial character for each facial region using the blending weight for each facial region of each key model and by synthesizing the generated facial characters.

When video data about the same person as the one in a facial image included in the image frames of the pre-processed video is input, the facial animation generation unit may generate facial animation using representative parameter information of facial regions of key models, corresponding to the facial region of the image frame, which is most similar to a facial region of a key model.

In another general aspect, there is provided s method of generating facial animation based on a video, the method including selecting an image frame having a facial region, which is most similar to a facial region of one of a plurality of key models of facial characters, from a sequence of image frames, determining a blending weight for each facial region of each of the key models using the selected image frame; and generating facial animation by synthesizing facial characters on a facial region-by-facial region basis using the determined blending weight for each facial region of each key model, wherein each of the key models is divided into a plurality of facial regions, and each of the image frames is divided into a plurality of facial regions.

The method may further include setting patches in each image frame, which are regions corresponding to the facial regions of each of the key models, in video data comprised of the image frames.

The selecting of the image frame having a facial region most similar to a facial region of one of a key model may further include comparing directions of respective 2D displacement vectors of vertices included in each key model with directions of respective optical flow vectors of pixels included in each image frame and calculating a similarity between the directions, wherein the 2D displacement vectors are determined based on vertices included in one of the key models, and the optical flow vectors of the pixels are generated by calculating optical flows of the pixels based on pixels included in one of the image frames.

Each of the key models may be a 3D shape, and the 2D displacement vectors of the vertices may be generated by determining respective 3D displacement vectors of the vertices included in each key model based on one of the key models and projecting the 3D displacement vectors onto a 2D plane.

The comparing of the directions and calculating of the similarity may include dividing each facial region of each key model into a plurality of sub-facial regions and dividing each facial region of each image frame into a plurality of sub-facial regions; and calculating a similarity between a direction of an average vector representing the average of 2D displacement vectors in each sub-facial region of each key model and a direction of an average vector representing the average of optical flow vectors in a corresponding sub-facial region of each image frame.

A parameter used to determine the blending weight for each facial region of each key model may be a 4D vector.

The method may further include generating a complete facial character by generating the facial character for each facial region using the blending weight for each facial region of each key model and synthesizing the generated facial characters. Other features and aspects will be apparent from the following detailed description, the drawings, and the claims.

BRIEF DESCRIPTION OF THE DRAWINGS

FIG. 1 is a diagram illustrating an example of an apparatus for generating facial animation.

FIG. 2 is a diagram illustrating an example of a pre-processing unit that may be included in the apparatus illustrated in FIG. 1.

Figure 3A:
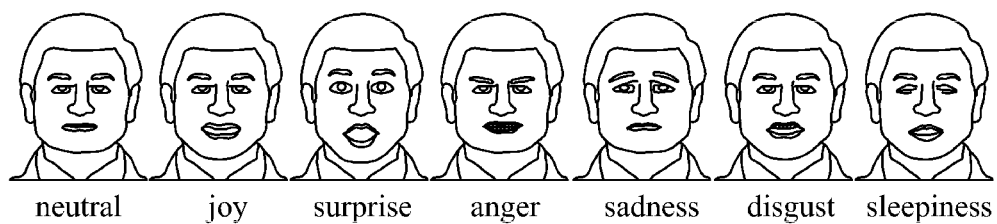
FIGS. 3A and 3B are examples of animated key models that are based on pronunciation and emotion.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and or systems described herein will be suggested to those of ordinary skill in the art. Also, descriptions of well-known functions and constructions may be omitted for increased clarity and conciseness.

FIG. 1 illustrates an example of an apparatus for generating facial animation. Referring to FIG. 1, the apparatus 100 generates facial animation by creating a facial character based on facial expressions included in a sequence of input image frames. The apparatus 100 includes a pre-processing unit 110, a storage unit 120, and a facial animation generation unit 130.

The pre-processing unit 110 receives image information, for example, a video, which includes a sequence of image frames. The pre-processing unit 110 also receives a plurality of key models of a virtual character. The number of key models may be less than the number of image frames included in a piece of video content. To generate numerous facial expressions of a facial image included in a sequence of image frames using a limited number of key models, the pre-processing unit 110 may divide and process the facial areas of the image frames and the facial areas of the key models.

In some embodiments, the pre-processing unit 110 may divide each of a plurality of key models of a facial character into a plurality of facial regions and set a plurality of patches. The patches are regions corresponding respectively to the facial regions of each of the key models, in each of a sequence of image frames. For example, the pre-processing unit 110 may process the key models and determine to divide each key model of a virtual character into three facial regions, for example, a left eye, a right eye, and a mouth, and extract patches from the image frames, which correspond respectively to the facial regions of the key model, from each image frame of a video. The three facial regions may later be synthesized together and the key models may be blended on a facial region-by-facial region basis so as to generate the whole virtual facial character.

The pre-processing unit 110 respectively selects an image frame having a facial region that is most similar to a facial region of each key model of a facial character, from a plurality of input image frames, for each facial region.

In some embodiments, the pre-processing unit 110 may process the key models and determine a plurality of facial regions for a virtual facial character, based on the key models. For example, the pre-processing unit 110 may determine the virtual facial character has two facial regions, three facial regions, four facial regions, or more. The pre-processing unit 110 may divide the facial area of the image frames into a plurality of facial regions, or patches, according to the determined facial regions for the virtual character. Throughout the specification, a facial region of an image frame denotes a patch region or a patch.

The storage unit 120 stores data processing results of the pre-processing unit 110. The data processing results include information about an image frame having a facial region that is most similar to a facial region of a key model. For example, when identification information of an image frame having a facial region most similar to a first facial region of key model #1 is #003 and when identification information of an image having a facial region most similar to a second facial region of key model #1 is #050, this information may be stored in the storage unit 120.

The facial animation generation unit 130 determines a blending weight for each facial region of each key model of a facial character, using a parameter that is determined based on an image frame having a facial region most similar to a facial region of a key model. The facial animation generation unit 130 blends the key models together using the determined blending weights and generates a facial character for a facial region. The facial animation generation unit 130 may blend the plurality of key models with respect to a facial region. This process may be repeated for any desired facial region. For example, the facial animation generation unit 130 may blend key models on a facial region-by-facial region basis for an image frame of a video and produce a three-dimensional (3D) output for each facial region of the image frame using the key models. Thus, the facial animation generation unit 130 may generate a complete facial expression by combining the 3D outputs.

An apparatus for generating facial animation may easily generate a facial animation at a low cost by using a piece of video data and a number of key models of a virtual character. Therefore, the difficulty of obtaining facial animation data using motion capture or stereo imaging technology or 3D scanning technology may be removed.

FIG. 2 illustrates an example of a pre-processing unit that may be included in the apparatus 100 illustrated in FIG. 1. Referring to FIG. 2, the pre-processing unit 110 includes a key model pre-processing unit 210, an image frame pre-processing unit 220, and a similarity calculation unit 230.

The key model pre-processing unit 210 includes a key model region divider 212 and a two-dimensional (2D) displacement vector generator 214.

The key model region divider 212 receives a plurality of key models. Key models may be a plurality of key models used in facial animation and may include, for example, key models pronouncing vowels and consonants, and/or key models expressing emotions. Examples of key models are shown in FIGS. 3A and 3B.

Figure 3B:
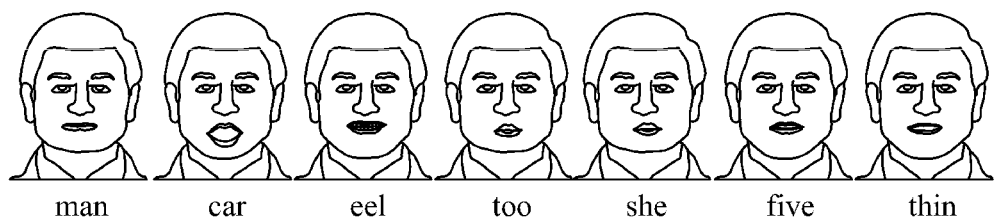

FIGS. 3A and 3B illustrate animated examples of key models based on pronunciation and emotion. For example, FIG. 3A illustrates animated key models expressing different emotions such as neutral, joy, surprise, anger, sadness, disgust, and sleepiness. FIG. 3B illustrates animated key models pronouncing consonants, such as "m," "sh," "f" and "th," and vowels such as "a," "e," and "o." Various key models other than those shown in FIGS. 3A and 3B may also be generated according to pronunciation and emotion.

Referring back to FIG. 2, the key model region divider 212 divides each key model into a plurality of facial regions. The dividing a key model into a plurality of facial regions may include, for example, extracting feature points, grouping the extracted feature points, and dividing vertices.

A key model may be represented as a spring-mass network composed of triangular meshes. When a key model is represented as a spring-mass network, vertices that form a face may be regarded as mass points, and each edge of each triangle formed by connecting the vertices may be regarded as a spring. In addition, each vertex (or mass point) may be indexed. Thus, a key model of the virtual facial character may include vertices, which have, for example, 600 indices, 800 indices, 1500 indices, or other desired amount of indices. The key model of facial character may also include edges (or springs).

The number of springs and the number of mass points may not vary from one key model to another. However, the position of mass points may vary according to a facial expression of a key model. Accordingly, a length of each spring connecting two of the mass points varies. Thus, for each key model expressing a different emotion, a displacement $\Delta x$ of a length "x" of each spring connecting two mass points and an energy variation ($E=\Delta x^2/2$) of each mass point may be measured based on a key model of a neutral facial expression.

When feature points are extracted from mass points of a key model in order to divide the key model into a plurality of facial regions, the change in the length of a spring connected to a mass point of each key model, which corresponds to each mass point of the key model of the neutral facial expression, may be measured. When the measured change in the length of a spring connected to a mass point is greater than the measured changes in the lengths of springs connected to its neighboring mass points, the mass point may be selected (extracted) as a feature point. When three springs are connected to one mass point, the average of changes in the lengths of the three springs may be used.

Figure 4:
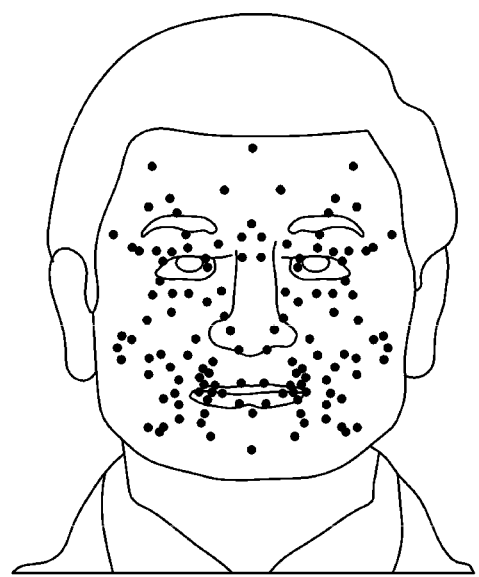
FIG. 4 is an animated key model illustrating an example of extracted feature points.

When a facial character image is represented by a spring-mass network, the key model region divider 212 may extract each of mass points connected by a spring as feature points. The key model region divider 212 may extract mass points connected by a spring when the change in the length of the spring is greater than a predetermined threshold value, based on a reference key model (the key model of the neutral expression). An example of extracted feature points is shown in the animated key model of FIG. 4.

The key model region divider 212 may measure coherence in the motion of extracted feature points and group the extracted feature points according to the measured coherence. The extracted feature points may be divided into a plurality of groups according to the measured coherence in the motion of the extracted feature points. To measure the coherence in the motion of the extracted feature points, displacements of the extracted feature points may be measured. The similarities in the magnitudes and directions of the displacements of the extracted feature points and the geometric proximity of the extracted feature points to their counterparts in the key model of the neutral facial expression may be measured as the coherence in the motion of the extracted feature points.

Once the coherence in the motion of the extracted feature points is quantified, a graph may be created based on the quantified coherence, for example, an undirected graph. The nodes of the graph may represent a feature point, and the edges of the graph may represent motion coherence.

When a value representing motion coherence is lower than a predetermined threshold value, the key model region divider 212 may determine that there is no coherence in motion. Accordingly, a corresponding edge may be removed. According to an embodiment, the nodes of the graph may be grouped using a connected component analysis technique. As a result, the extracted feature points may be automatically divided into a plurality of groups.

The key model region divider 212 may further include the mass points (vertexes) unselected as a feature point in a corresponding group of feature points. The key model region divider 212 may measure the coherence between the motion of each mass point unselected as a feature point and the motion of each group of feature points.

The coherence between the motion of each unselected mass point and the motion of each group of feature points may be measured in the same way as feature points are grouped. The coherence in the motion of each group of feature points and the motion of each mass point unselected as a feature point may be determined to be the average of values, each representing the coherence between the motion of each feature point in each group and the motion of each mass point unselected as a feature point. When a value representing the coherence between the motion of a feature point group and a mass point unselected as a feature point exceeds a predetermined threshold value, the mass point may be included in the feature point group. Thus, one mass point may be included in several feature point groups.

When mass points (vertices) for modeling a facial character shape are divided into a plurality of groups, the facial character shape may be divided into the groups. As a result, indices may be generated for vertices in each facial region of a key model. In some embodiments, a key model of a facial character may be divided into a first facial region containing a left eye, a second facial region containing a right eye, and a third facial region containing an area around a mouth. For example, vertices in the area around the mouth may be indexed with a list of vertex identification information, for example, in the form of {1, 4, 122, 233, ... 599}. Each facial region of the facial character shape and data on each facial region may be applied to each key model and used when the key models are synthesized on a facial region-by-facial region basis.

The 2D displacement vector generator 214 determines respective 3D displacement vectors of vertices included in each key model, of a facial character based on a key model selected from the key models. The 2D displacement vector generator 214 projects the 3D displacement vectors onto a 2D plane to generate 2D displacement vectors of the vertices. For example, the selected key model may be the key model of the neutral facial expression. The 3D displacement vector may be projected onto a 2D plane to compare the 3D displacement vector with a 2D optical flow vector that indicates the displacement of a facial expression included in a 2D video image.

Figure 5:
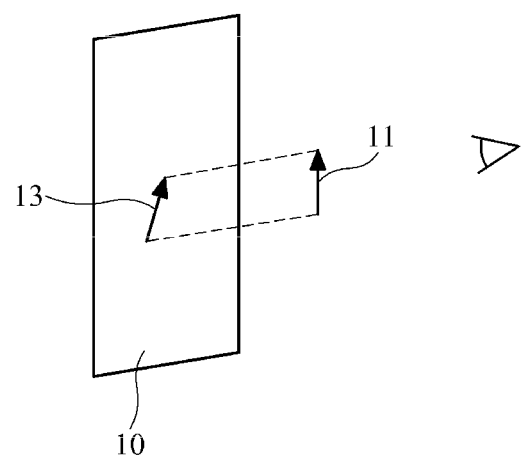
FIG. 5 illustrates an example of a three-dimensional (3D) displacement vector projected onto a two-dimensional (2D) plane.

FIG. 5 illustrates an example of a 3D displacement vector projected onto a 2D plane. Referring to FIG. 5, the 3D displacement vector 11 is projected onto the 2D plane 10 and is approximated to a 2D displacement vector 13.

The configuration of the image frame pre-processing unit 220 will be described with reference to FIG. 2.

Referring to FIG. 2, an image frame region divider 222 sets patches in each of a sequence of image frames. The patches correspond to a plurality of facial regions of a key model. For example, when the key model region divider 212 divides each of a plurality of key models into a first facial region containing a left eye, a second facial region containing a right eye, and a third facial region containing an area around a mouth, the image frame divider 222 may set patches, which correspond to the first through third facial regions, in each of a plurality of image frames.

Figure 6:
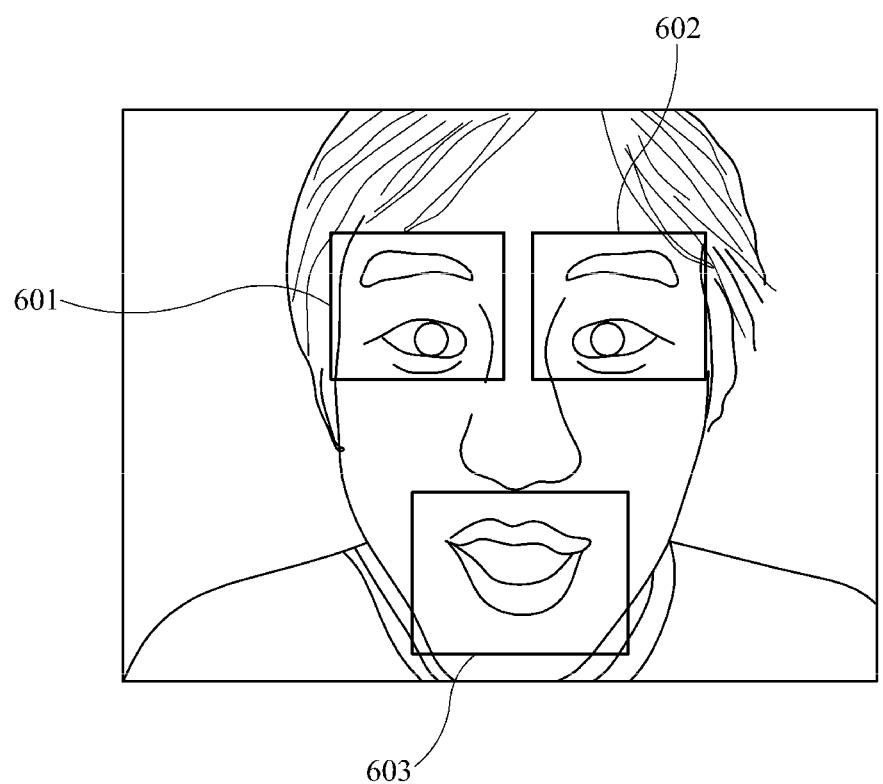
FIG. 6 is a diagram illustrating an example of patches set in an image frame.

FIG. 6 illustrates an example of patches set in an image frame. Referring to FIG. 6, the image frame region divider 222 may decide that three regions, for example, a left eye region, a right eye region, and a mouth region, include features determining a facial expression in all image frames of a video. Accordingly, the image frame region divider 222 may set patches corresponding respectively to a left eye region 601, a right eye region 602, and a mouth region 603 in each image frame of the video. Each patch may include motions of feature points of a corresponding facial region.

Referring back to FIG. 2, an optical flow calculator 224 obtains a 2D displacement vector of each pixel in each image frame of a video by calculating the optical flow of each pixel based on a reference image frame, for example, an image frame of the neutral facial expression. Optical flow calculation may be used to obtain 2D displacement vectors of pixels to estimate the motion of an object in one of two 2D images relative to the other 2D image.

The similarity calculation unit 230 compares 2D displacements of vertices generated by the 2D displacement vector generator 214 with displacements of image pixels calculated by the optical flow calculator 224, and matches the 2D displacements of the vertices respectively with the displacements of the image pixels which are most similar to the 2D displacements of the vertices. As a result, the similarity calculation unit 230 may select an image frame having a facial region, which is most similar to a facial region of one of a plurality of key models of facial character, from a plurality of input image frames. The similarity calculation unit 230 may perform this calculation for any desired amount of image frames. In some embodiments, the similarity calculation unit 230 may perform the calculation for each facial region of each image frame.

The similarity calculation unit 230 compares directions of respective 2D displacement vectors of vertices included in each key model with directions of respective optical flow vectors of pixels included in each image frame and calculates the similarity between the directions. The 2D displacement vectors of the vertices included in each key model may be determined based on vertices included in one or more of the key models, for example, the neutral facial expression, the joy facial expression, the surprise facial expression, the anger facial expression, the sadness facial expression, the disgust facial expression, the sleepiness facial expression, and the like. The optical flow vectors of the pixels included in each image frame may be generated by calculating optical flows of the pixels based on pixels included in the image frame of one or more of the different facial expression.

The similarity calculation unit 230 may divide the plurality of facial regions of each key model of a facial character into a plurality of sub-facial regions and divide each of a plurality of facial regions of the image frames into a plurality of sub-facial regions. The similarity calculation unit 230 may calculate a similarity between the direction of an average vector representing the average of 2D displacement vectors in each sub-facial region of the key models and the direction of an average vector representing the average of optical flow vectors in a corresponding sub-facial region of the image frames. The similarity calculation unit 230 may divide each facial region of each key model and each facial region of each image frame into quadrants as illustrated in FIGS. 7A and 7B.

Figure 7A:
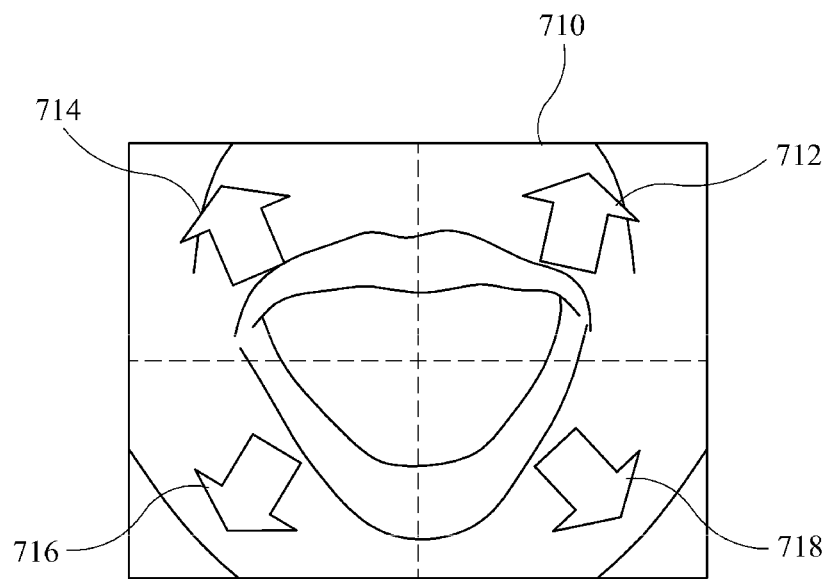
FIG. 7A is a diagram illustrating an example of optical flow vectors in a facial region of an image frame.

FIG. 7A illustrates an example of average optical flow vectors in a facial region of an image frame. FIG. 7B illustrates an example of average displacement vectors in a facial region of a key model of a facial character.

Referring to FIG. 7A, when the average of optical flow vectors of pixels included in each quadrant of a mouth region patch 710 is calculated, one or more vectors may be obtained, for example, four vectors 712, 714, 716, and 718. The vector 712 is an average vector representing the average of optical flow vectors of pixels included in a first quadrant of the mouth region patch 710. The vector 714 is an average vector representing the average of optical flow vectors of pixels included in a second quadrant of the mouth region patch 710. The vector 716 is an average vector representing the average of optical flow vectors of pixels included in a third quadrant of the mouth region patch 710. The vector 718 is an average vector representing the average of optical flow vectors of pixels included in a fourth quadrant of the mouth region patch 710.

Figure 7B:
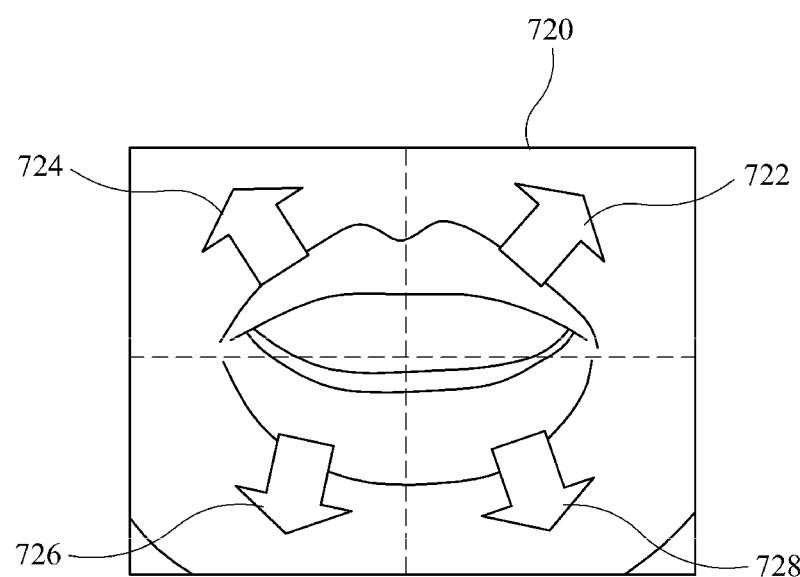
FIG. 7B is a diagram illustrating an example of displacement vectors in a facial region of a key model.

Referring to FIG. 7B, when the average of displacement vectors of vertices included in each quadrant of a mouth region patch 720 of a key model is calculated, one or more vectors may be obtained, for example, four vectors 722, 724, 726, and 728. The vector 722 is an average vector representing the average of displacement vectors of vertices included in a first quadrant of the mouth region 720. The vector 724 is an average vector representing the average of displacement vectors of vertices included in a second quadrant of the mouth region 720. The vector 726 is an average vector representing the average of displacement vectors of vertices included in a third quadrant of the mouth region 720. The vector 728 is an average vector representing the average of displacement vectors of vertices included in a fourth quadrant of the mouth region 720.

The similarity calculation unit 230 may compare directions of 2D displacement vectors of vertices included in the key models with directions of optical flow vectors of pixels included in the image frames and calculate the similarity between the directions. As described above, optical flow vectors of pixels included in each image frame may be generated by calculating optical flows of the pixels based on pixels included in one of the image frames.

The similarity calculation unit 230 may calculate an angle difference between a vector of a quadrant of a key model and a vector of a corresponding quadrant of an image frame. For example, the similarity calculation unit 230 may calculate an angle difference $\theta_1$ between the vectors 712 and 722, an angle difference $\theta_2$ between the vectors 714 and 724, an angle difference $\theta_3$ between the vectors 716 and 726, and an angle difference $\theta_4$ between the vectors 718 and 728. The similarity calculation unit 230 may calculate the average of the angle differences between $\theta_1$ through $\theta_4$. When the calculated average of the angle differences $\theta_1$ through $\theta_4$ approaches zero, the similarity calculation unit 230 may determine that there is a high similarity between the mouth region patch 710 of the image frame shown in FIG. 7A and the mouth region 720 of the key model shown in FIG. 7B.

Figure 8:
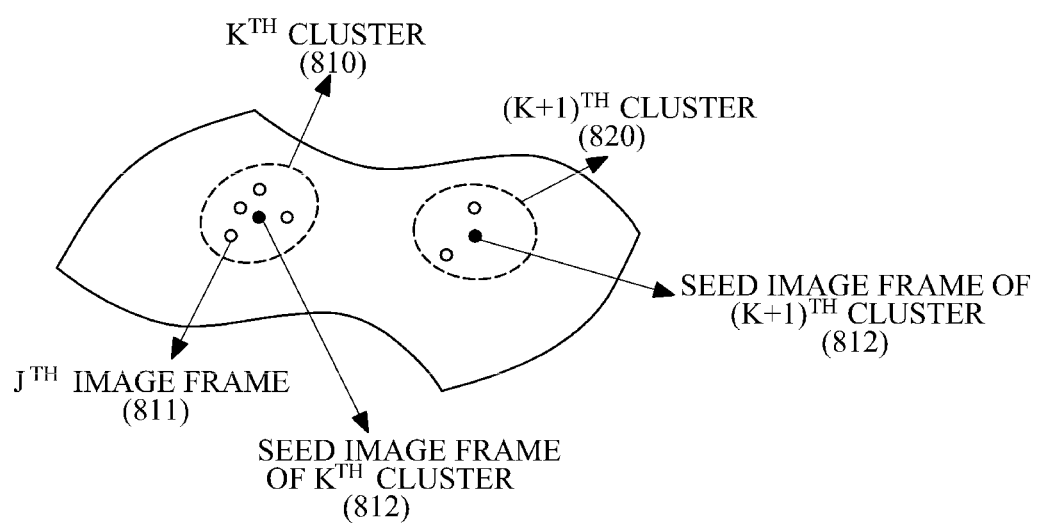
FIG. 8 is a diagram illustrating an example of parameter space.

FIG. 8 illustrates an example of parameter space. The parameter space may be set independently for each facial region. For example, a separate parameter space may be set for each of a left-eye region, a right-eye region, and a mouth region, to represent displacement vectors of image frames with respect to a reference image frame. In addition, a four-dimensional (4D) real number vector may be generated using angles ranging from 0 to 360 degrees of the vectors 712 through 718 of the quadrants shown in FIG. 7A, and the generated 4D real number vector may be used as a parameter.

The parameter space illustrated in FIG. 8 may be a parameter space of, for example, a mouth region, and parameters for optical flow vectors of a plurality of image frames, which are calculated based on a reference image frame, may be set in the parameter space. While only two clusters are illustrated in FIG. 8, the similarity calculation unit 230 may group 4D parameters in the parameter space into a number of clusters equal to the number of key models.

Referring to the parameter space of FIG. 8, in this example, a parameter of a seed image frame 812 included in a $k^{th}$ cluster 810 is determined to be most similar to a 2D displacement vector of a $k^{th}$ key model. Therefore, to synthesize an image character corresponding to another image frame in the $k^{th}$ cluster 810, for example, a $j^{th}$ image frame 811, a blending weight of each of a plurality of key models may be calculated. The blending weight may be based on the distance between the parameter of the $j^{th}$ image frame 811 and the parameter of the seed image frame 812 in the $k^{th}$ cluster 810, and the distances between the parameter of the $j^{th}$ image frame 811 and parameters of seed image frames in the other clusters (not shown).

After clustering parameters of optical vectors of a plurality of image frames by setting a seed image frame, it may be found that an optical flow vector corresponding to the average of optical flow vectors included in a corresponding cluster is different from an optical flow vector of the set seed image frame. When this occurs, an optical flow vector corresponding to the average of all vectors included in each cluster may be selected as a representative value and used as a new reference value to calculate a blending weight of each key model.

In summary, the similarity calculation unit 230 may select an image frame having a facial region, which is most similar to a facial region of one of a plurality of key models of a facial character, from a plurality of image frames, based on the similarity between 2D displacement vectors and optical flow vectors. In addition, the similarity calculation unit 230 may set an optical flow vector of a facial region of an image frame, which is most similar to a facial region of a key model, as a seed and cluster optical flow vectors of the facial regions of the other image frames using the optical flow vector set as the seed. Then, the similarity calculation unit 230 may determine an image frame having an optical flow vector, which is most similar to the average of all vectors in each cluster, as an image frame having a facial region most similar to a facial region of a key model in the cluster.

Figure 9:
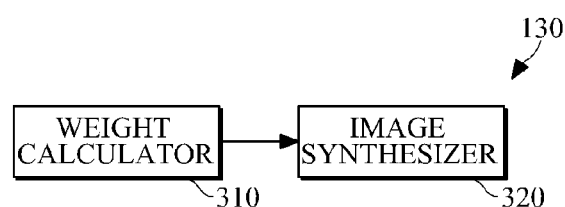
FIG. 9 is a diagram illustrating an example of a facial animation generation unit that may be included in the apparatus illustrated in FIG. 1.

FIG. 9 illustrates an example of a facial animation generation unit that may be included in the apparatus 100 illustrated in FIG. 1. Referring to FIG. 9, the facial animation generation unit 130 includes a weight calculator 310 and an image synthesizer 320.

The weight calculator 310 may use a 4D vector as a parameter to determine a blending weight for each facial region of each of a plurality of key models of a facial character. The 4D vector indicates the direction of an optical flow vector in each quadrant of each facial region of an image frame. The weight calculator 310 may determine a blending weight for each facial region of the key model such that the blending weight is inversely proportional to the distance of a representative parameter value corresponding to each key model from the parameter of the image frame. To determine a blending weight, a distributed data interpolation technique may be used. Examples of interpolation techniques are described in "Shape by Example," by Peter-Pike J. Sloan et al.

The image synthesizer 320 may synthesize key models on a facial region-by-facial region basis using a blending weight of each facial region of each of the key models and thus generate a facial character for each facial region. In addition, the image synthesizer 320 may synthesize the respective facial characters of the facial regions to generate the whole facial character.

Figure 10:
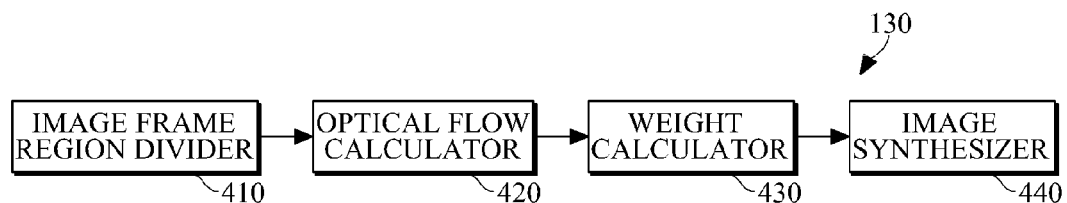
FIG. 10 is a diagram illustrating an example of another facial animation generation unit that may be included in the apparatus illustrated in FIG. 1.

FIG. 10 illustrates another example of a facial animation generation unit that may be included in the apparatus 100 illustrated in FIG. 1.

Referring to FIG. 10, the facial animation generation unit 130 includes an image frame region divider 410, an optical flow calculator 420, a weight calculator 430, and an image synthesizer 440. The image frame region divider 410 and the optical flow calculator 420 perform the same respective functions as the image frame region divider 222 and the optical flow calculator 224 included in the image frame pre-processing unit 220 illustrated in FIG. 2, and the weight calculator 430 and the image synthesizer 440 perform the same respective functions as the weight calculator 310 and the image synthesizer 320 of FIG. 9.

When video data about the same person as the one in a facial image included in image frames of a pre-processed video is input, the image frame region divider 410 may set patches in each image frame, and the optical flow calculator 420 may calculate the optical flow of each patch in each image frame.

The weight calculator 430 may calculate blending weights of key models for each image frame using previously calculated representative parameter information corresponding to a facial region of an image frame which is most similar to a facial region of a key model. The image synthesizer 440 may generate a facial animation by synthesizing respective facial character shapes of the facial regions using the calculated blending weights.

Figure 11:
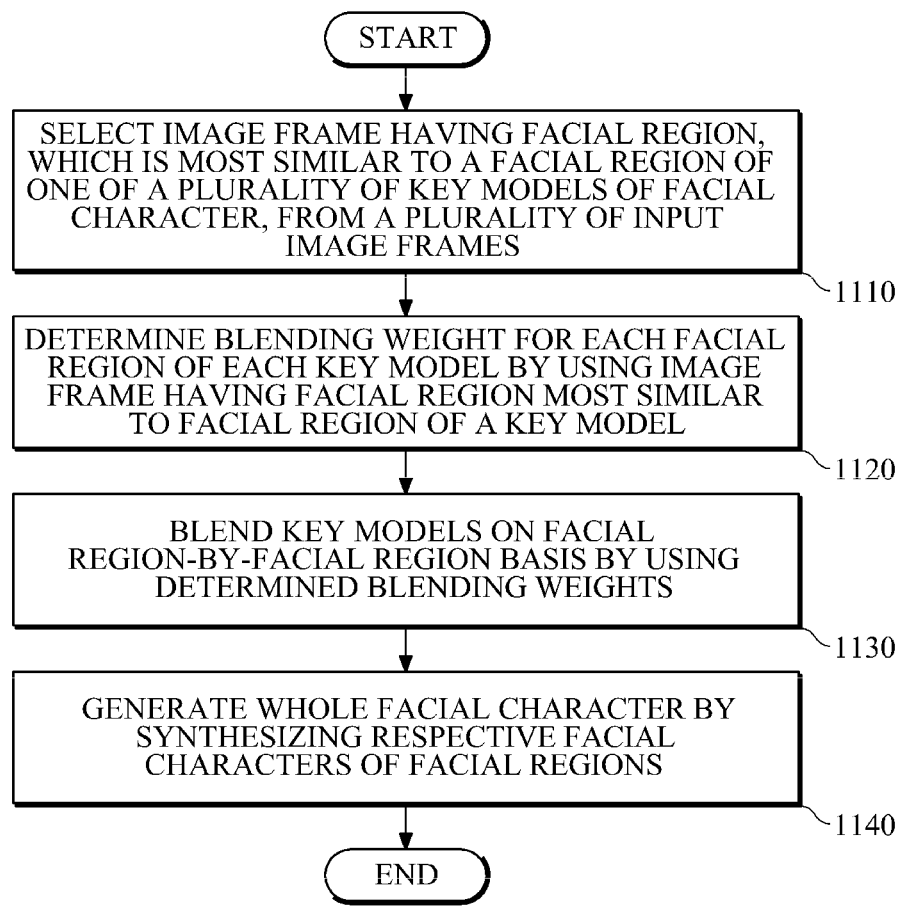
FIG. 11 is a flowchart illustrating an example of a method for generating facial animation.

FIG. 11 illustrates an example of a method for generating facial animation.

Referring to FIG. 11, the apparatus 100 illustrated in FIG. 1 selects an image frame having a facial region, which is most similar to a facial region of one of a plurality of key models of a face character, from a plurality of input image frames, in 1110. The apparatus 100 may set patches, which are regions corresponding respectively to the facial regions of each key model, in video data composed of a sequence of the image frames.

In 1120, the apparatus 100 determines a blending weight for each facial region of each key model by using the image frame having the facial region most similar to a facial region of a key model. The respective 2D displacement vectors of vertices included in each key model may be determined based on vertices included in one of the key models, and respective optical flow vectors of pixels included in each image frame may be generated by calculating optical flows of the pixels based on pixels included in one of the image frames. Then, the directions of the 2D displacement vectors may be compared with the directions of the optical flow vectors to determine the similarity between them.

In addition, each of the facial regions of each key model may be divided into a plurality of sub-facial regions, and each of the facial regions of each image frame may be divided into a plurality of sub-facial regions. Then, a similarity between the direction of an average vector representing the average of 2D displacement vectors in each sub-facial region of each key model and the direction of an average vector representing the average of optical flow vectors in a corresponding sub-facial region of each image frame may be calculated.

In 1130, the apparatus 100 synthesizes facial character shapes on a facial region-by-facial region basis using the determined blending weight for each facial region of each key model. The apparatus 100 generates the whole facial character by synthesizing respective facial characters of the facial regions which are generated using the blending weight for each facial region of each key model, in 1140. When operations 1130 and 1140 are performed for each sequence of image frames, a facial animation, which makes facial expressions similar to facial expressions of a person included in the image frames, can be generated and output.

According to example(s) described above, provided herein are an apparatus and a method for receiving a video input by a user, and the video may be broken into image frames. For each image frame an image region of a key model may be matched/selected to an image range of the image frame. This matching/selecting may be performed for each image region of each image frame. Once each image frame has been processed, the image frames can be used for animation. The animation is done by synthesizing each image region using the key models selected for each specific image region. Furthermore, to complete the animated facial character, the image regions are combined with a weighting algorithm. The result is a complete animated facial character that represents the video that was input.

According to the examples described above, provided herein are an apparatus and method for generating facial animation of a facial character, which makes facial expressions according to two-dimensional (2D) facial expressions included in image frames of an input video, by using video data of the input video and a limited number of three-dimensional (3D) key models of a virtual character.

The processes, functions, methods and software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for generating facial animation, the apparatus comprising:
a pre-processing unit for selecting an image frame having a facial region that is most similar to a facial region of one of a plurality of key models of facial characters, from a sequence of image frames, each image frame being divided into a plurality of facial regions;
a facial animation generation unit for determining a blending weight for each selected facial region of the key models using the selected facial region and for synthesizing facial character shapes on a facial region-by-facial region basis using the determined blending weight for each facial region of each of the key models; and
a display device for displaying facial animation,
wherein the pre-processing unit compares directions of respective two-dimensional (2D) displacement vectors of vertices included in each key model with directions of respective optical flow vectors of pixels included in each image frame and calculates a similarity between the directions, wherein the 2D displacement vectors are determined based on vertices included in one of the key models, and the optical flow vectors of the pixels are generated by calculating optical flows of the pixels based on pixels included in one of the image frames.

2. The apparatus of claim 1, wherein the pre-processing unit processes each of the plurality of key models and determines a plurality of facial regions for the key models, and sets patches corresponding individually to the facial regions of each of the key models, in each of the image frames.

3. The apparatus of claim 2, wherein the pre-processing unit divides each of the key models into a left eye region, a right eye region, and a mouth region, and sets patches, which correspond to the left eye region, the right eye region, and the mouth region, in each of the image frames.

4. The apparatus of claim 1, wherein the pre-processing unit determines respective three-dimensional (3D) displacement vectors of the vertices included in each key model, based on one of the key models, and projects the 3D displacement vectors onto a 2D plane to generate the 2D displacement vectors of the vertices.

5. The apparatus of claim 1, wherein the pre-processing unit divides each facial region of each key model into a plurality of sub-facial regions and divides each facial region of each image frame into a plurality of sub-facial regions and calculates a similarity between a direction of an average vector representing the average of 2D displacement vectors in each sub-facial region of each key model and a direction of an average vector representing the average of optical flow vectors in a corresponding sub-facial region of each image frame.

6. The apparatus of claim 5, wherein the pre-processing unit divides each facial region of each key model and of each image frame into quadrants.

7. The apparatus of claim 1, wherein the pre-processing unit sets an optical flow vector of the facial region of the image frame which is most similar to a facial region of a key model, as a seed, clusters optical flow vectors of the facial regions of the other image frames using the optical flow vector set as the seed, and determines an image frame having an optical flow vector, which corresponds to the average of all optical vectors in each cluster, as an image frame having a facial region most similar to a facial region of a key model in the cluster.

8. The apparatus of claim 7, wherein the pre-processing unit groups the optical flow vectors of the image frames into a number of clusters equal to the number of key models.

9. The apparatus of claim 6, wherein the facial animation generation unit uses a four-dimensional (4D) vector, which indicates a direction of an optical flow vector in each quadrant of each facial region, as a parameter to determine the blending weight for each facial region of each key model.

10. An apparatus for generating facial animation, the apparatus comprising:
a pre-processing unit for selecting an image frame having a facial region that is most similar to a facial region of one of a plurality of key models of facial characters, from a sequence of image frames, each image frame being divided into a plurality of facial regions;
a facial animation generation unit for determining a blending weight for each selected facial region of the key models using the selected facial region and for synthesizing facial character shapes on a facial region-by-facial region basis using the determined blending weight for each facial region of each of the key models; and
a display device for displaying facial animation,
wherein the facial animation generation unit determines the blending weight for each facial region of each key model such that the determined blending weight is inversely proportional to a distance of a representative parameter value corresponding to each key model from the parameter of the image frame.

11. The apparatus of claim 1, wherein the facial animation generation unit generates a whole facial character by generating a facial character for each facial region using the blending weight for each facial region of each key model and by synthesizing the generated facial characters.

12. The apparatus of claim 1, wherein when video data about the same person as the one in a facial image included in the image frames of the pre-processed video is input, the facial animation generation unit generates facial animation using representative parameter information corresponding to the facial region of the image frame, which is most similar to a facial region of a key model.

13. A method of generating facial animation based on a video, the method comprising:
selecting an image frame having a facial region that is most similar to a facial region of one of a plurality of key models of facial characters, from a sequence of image frames;
determining a blending weight for each facial region of each of the key model using the selected image frame;
generating facial animation by synthesizing facial characters on a facial region-by-facial region basis using the determined blending weight for each facial region of each key model; and
displaying the facial animation on a display device,
wherein each of the key models is divided into a plurality of facial regions, and each of the image frames is divided into a plurality of facial regions, wherein the selecting of the image frame having a facial region most similar to a facial region of one of a key model further comprises comparing directions of respective 2D displacement vectors of vertices included in each key model with directions of respective optical flow vectors of pixels included in each image frame and calculating a similarity between the directions, wherein the 2D displacement vectors are determined based on vertices included in one of the key models, and the optical flow vectors of the pixels are generated by calculating optical flows of the pixels based on pixels included in one of the image frames.

14. The method of claim 13, further comprising setting patches in each image frame, which are regions corresponding to the facial regions of each of the key models, in video data comprised of the image frames.

15. The method of claim 13, wherein each of the key models is a 3D shape, and the 2D displacement vectors of the vertices are generated by determining respective 3D displacement vectors of the vertices included in each key model based on one of the key models and projecting the 3D displacement vectors onto a 2D plane.

16. The method of claim 13, wherein the comparing of the directions and calculating of the similarity comprises:
  dividing each facial region of each key model into a plurality of sub-facial regions and dividing each facial region of each image frame into a plurality of sub-facial regions; and
  calculating a similarity between a direction of an average vector representing the average of 2D displacement vectors in each sub-facial region of each key model and a direction of an average vector representing the average of optical flow vectors in a corresponding sub-facial region of each image frame.

17. The method of claim 13, wherein a parameter used to determine the blending weight for each facial region of each key model is a 4D vector.

18. The method of claim 13, further comprising generating a complete facial character by generating the facial character for each facial region using the blending weight for each facial region of each key model and synthesizing the generated facial characters.

19. The apparatus of claim 1, wherein the key models are represented as spring-mass networks and the position of mass points may vary according to a facial expression of the key models.

20. An apparatus for generating facial animation, the apparatus comprising:
  a pre-processing unit for selecting an image frame having a facial region that is most similar to a facial region of one of a plurality of key models of facial characters, from a sequence of image frames, each image frame being divided into a plurality of facial regions;
  a facial animation generation unit for determining a blending weight for each selected facial region of the key models using the selected facial region and for synthesizing facial character shapes on a facial region-by-facial region basis using the determined blending weight for each facial region of each of the key models; and
  a display device for displaying facial animation,
  wherein a key model region divider may extract mass points of each of the key models when a change in length of a spring is greater than a predetermined threshold value compared with a reference key model, and may divide the extracted mass points into a plurality of groups according to coherence in motion.

* * * * *